Patented Sept. 1, 1931

1,821,092

UNITED STATES PATENT OFFICE

MAURICE A. DEBEAU AND HOMER L. ROBSON, OF WESTEND, CALIFORNIA, ASSIGNORS TO BURNHAM CHEMICAL COMPANY, OF RENO, NEVADA, A CORPORATION OF NEVADA

PROCESS OF OBTAINING BORAX FROM BRINES

No Drawing.   Application filed February 6, 1928.   Serial No. 252,420.

The invention relates to a process of obtaining borax from brine containing the same, and particularly from brines of the alkali lakes of the western United States.

An object of the invention is to provide a simple and inexpensive process for obtaining borax from brine containing the same and other salts.

The invention possesses other advantageous features, some of which with the foregoing will be set forth at length in the following description, where we shall outline in full one form of the process of our invention. We shall describe the process as applied to the brine of Searles Lake in California, but it is to be understood that the process is not limited to this particular brine.

Searles Lake brine contains sodium, potassium, chloride, sulfate, carbonate, bicarbonate and borate ions and is substantially saturated with sodium chloride. In accordance with one embodiment of our process, the raw brine of Searles Lake, which has a normal temperature between 23° and 25° centigrade, is concentrated, either by solar evaporation or by the artificial application of heat, until the original volume of the brine has been reduced to about one half. During this concentration, sodium chloride is precipitated out and the brine becomes substantially saturated with sulfate and carbonate ions. The concentrated brine is then treated to reduce the carbonate concentration or the sulfate and carbonate concentration and the reduction of this concentration may be accomplished in several ways. The concentrated brine may be heated, preferably without evaporation, to a temperature between 50° and 90° centigrade, preferably to about 70° centigrade, to cause the precipitation of the double salt, sodium carbonate sulfate. The remaining liquor is separated from the precipitated salt, which salt has a market value. The precipitation of the sodium carbonate sulfate reduces the sulfate and carbonate concentration of the concentrated brine.

Instead of heating the concentrated brine, to cause the precipitation of the double salt, the brine may be cooled to below 14° centigrade, to cause the precipitation of sodium sulfate and sodium carbonate. A further method of rendering the brine unsaturated with carbonate comprises adding water or raw brine to the concentrated brine.

The concentrated brine, after having been separated from the deposited crystals and rendered unsaturated with respect to sodium carbonate, is then chilled to a temperature between 15° and 25° centigrade and is then subjected to contact with sulfur dioxide and preferably, the sulfur dioxide is employed in sufficient quantity to reduce the solubility of the boric oxide ($B_2O_3$) in the resultant brine to about 10 gr. per liter. We have obtained excellent results with sulfur dioxide, but any other equivalent acid reagent may be employed. The concentrated brine is preferably contacted with the acid reagent or sulfur dioxide in an absorption tower. The brine is discharged into the upper portion of the absorption tower thru spray nozzles and the sulfur dioxide is forced to flow in the opposite direction from the bottom of the absorption tower so that practically all of the gas is absorbed by the brine. The sulfurized brine, while it is contained in the absorption tower, is preferably subjected to a minimum of agitation, to prevent the crystallizing of borax in the tower. After being discharged from the tower, the sulfurized brine is subjected to agitation, whereby borax is precipitated in commercial quantities. When the brine is unsaturated with respect to any other salt than borax, pure borax is precipitated upon agitation of the brine. The precipitated borax is then separated from the remaining liquor and is ready to be prepared for market.

Instead of chilling the brine before contacting it with sulfur dioxide gas, the warm brine may be contacted with the gas and the sulfurized brine subsequently chilled and agitated to cause the precipitation of borax. This procedure has the operating advantage of preventing or minimizing the crystallizing of borax in the absorption tower.

We claim:

1. The process of obtaining borax from brine such as Searles Lake brine which consists in concentrating the brine, reducing the sulfate and carbonate concentration of the concentrated brine and contacting the resultant brine with an acid reagent.

2. The process of obtaining borax from brine such as Searles Lake brine which consists in concentrating the brine, reducing the sulfate and carbonate concentration of the concentrated brine, chilling the resultant brine and contacting the chilled brine with sulfur dioxide.

3. The process of obtaining borax from brine such as Searles Lake brine which consists in concentrating the brine, reducing the sulfate and carbonate concentration of the brine, contacting the resultant brine with an acid reagent and agitating the resultant brine.

4. The process of obtaining borax from brine such as Searles Lake brine which consists in concentrating the brine, reducing the sulfate and carbonate concentration of the concentrated brine, chilling the resultant brine, contacting the chilled brine with sulfur dioxide and agitating the sulfurized brine.

5. The process of obtaining borax from brine such as Searles Lake brine which comprises concentrating the brine, reducing the sulfate and carbonate concentration of the brine, chilling the resultant brine, subjecting the chilled brine to contact with sulfur dioxide with a minimum of agitation and agitating the sulfurized brine.

6. The process of obtaining borax from brine such as Searles Lake brine which consists in concentrating the brine, treating the concentrated brine to render it unsaturated with sodium carbonate and contacting the resultant brine with sulfur dioxide.

7. The process of obtaining borax from brine such as Searles Lake brine which consists in concentrating the brine, treating the concentrated brine to render it unsaturated with sodium carbonate, chilling the resultant brine and contacting the chilled brine with sulfur dioxide.

8. The process of obtaining borax from brine such as Searles Lake brine which consists in concentrating the brine, treating the concentrated brine to render it unsaturated with sodium carbonate, chilling the resultant brine, contacting the chilled brine with sulfur dioxide and agitating the sulfurized brine.

9. The process of obtaining borax from brine such as Searles Lake brine which consists in concentrating the brine, heating the concentrated brine to precipitate sodium carbonate sulfate, chilling the remaining brine and contacting the chilled brine with sulfur dioxide.

10. The process of obtaining borax from brine such as Searles Lake brine which comprises concentrating the brine, heating the concentrated brine to about 70° C. to precipitate sodium carbonate sulfate, chilling the resultant brine to between 15° C. to 25° C. and contacting the chilled brine with sulfur dioxide.

11. The process of obtaining borax from alkaline brine which is normally saturated with sodium chloride and a carbonate salt which consists in treating the brine to render it unsaturated with carbonate ions and contacting the resultant brine with sulfur dioxide.

12. The process of obtaining borax from brine such as Searles Lake brine which comprises concentrating the brine, treating the concentrated brine to render it unsaturated with respect to all contained salts except borax and contacting the resultant brine with sulfur dioxide in sufficient quantity to reduce the solubility of borax to a point where the boric oxide ($B_2O_3$) content in the brine is about 10 gr. per liter.

13. The process of obtaining borax from an alkaline brine containing borate ions sodium carbonate and other salts, which consists in concentrating the brine to deposit other salts, treating the brine to reduce the carbonate concentration, cooling the brine and contacting the cooled brine with sulfur dioxide gas.

14. The process of obtaining borax from an alkaline brine containing borate ions, sodium carbonate and other salts, which consists in concentrating the brine to deposit other salts, treating the brine to reduce the carbonate concentration, cooling the brine, contacting the cooled brine with sulfur dioxide gas and agitating the sulfurized brine to precipitate borax.

15. That step in the process of obtaining borax from a brine substantially free of sodium carbonate which comprises contacting the brine with the acid reagent, sulphur dioxide.

In testimony whereof, we have hereunto set our hands.

MAURICE A. DEBEAU.
HOMER L. ROBSON.